United States Patent
Kato (10) Patent No.: US 7,693,655 B2
(45) Date of Patent: Apr. 6, 2010

(54) NAVIGATION SYSTEM INCLUDING DATABASE FOR STORING FEATURE INFORMATION FOR POINTS OF INTEREST

(75) Inventor: Noriko Kato, Toyoake (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/485,317

(22) Filed: Jul. 13, 2006

(65) Prior Publication Data
US 2007/0027619 A1 Feb. 1, 2007

(30) Foreign Application Priority Data
Jul. 27, 2005 (JP) ............................. 2005-217752

(51) Int. Cl.
*G01C 21/30* (2006.01)

(52) U.S. Cl. ..................... 701/208; 701/200; 701/207; 340/990; 340/995.1; 340/995.14; 340/995.19; 340/995.24

(58) Field of Classification Search .............. 701/208, 701/200, 207
See application file for complete search history.

(56) References Cited

U.S. PATENT DOCUMENTS

| | | | |
|---|---|---|---|
| 5,168,452 A * | 12/1992 | Yamada et al. ............. 701/202 |
| 5,832,406 A * | 11/1998 | Iwami et al. ............... 701/202 |
| 5,874,905 A * | 2/1999 | Nanba et al. ............ 340/995.2 |
| 5,911,773 A * | 6/1999 | Mutsuga et al. ............ 701/200 |
| 6,188,949 B1 * | 2/2001 | Hahn et al. ................. 701/93 |
| 6,389,332 B1 * | 5/2002 | Hess et al. ..................... 701/1 |
| 6,484,094 B1 * | 11/2002 | Wako ......................... 701/211 |
| 6,542,814 B2 * | 4/2003 | Polidi et al. ................ 701/208 |
| 6,691,028 B2 * | 2/2004 | Bullock et al. ............. 701/202 |
| 6,735,515 B2 * | 5/2004 | Bechtolsheim et al. ...... 701/208 |
| 6,904,362 B2 * | 6/2005 | Nakashima et al. ......... 701/211 |
| 7,092,817 B2 * | 8/2006 | Kato ............................ 701/208 |
| 7,155,339 B2 * | 12/2006 | Tu .............................. 701/209 |
| 7,254,481 B2 | 8/2007 | Yamada et al. |
| 7,321,826 B2 * | 1/2008 | Sheha et al. ................ 701/209 |
| 7,388,519 B1 * | 6/2008 | Kreft ...................... 340/995.24 |

(Continued)

FOREIGN PATENT DOCUMENTS

JP 08-249307 A 9/1996

(Continued)

OTHER PUBLICATIONS

Notice of Final Rejection issued on Nov. 30, 2007 in corresponding Korean Patent Application No. 10-2006-0070471 (and English translation).

(Continued)

*Primary Examiner*—Khoi Tran
*Assistant Examiner*—Jonathan Sample
(74) *Attorney, Agent, or Firm*—Posz Law Group, PLC (57) ABSTRACT

In a navigation system, a current position is designated as a center of a start-point area. A category of a spot, e.g., a point of interest, is designated. Feature information of a spot within the start-point area then appears on a display device as initially provided information to a user with respect to the spot. This feature information allows the user to easily perceive the feature of the spot. The user only needs operation up to designating the category and can easily determine whether the spot is an intended one by perceiving its feature.

11 Claims, 5 Drawing Sheets

U.S. PATENT DOCUMENTS

| | | | |
|---|---|---|---|
| 7,522,992 B2* | 4/2009 | Obradovich et al. | 701/200 |
| 2003/0036848 A1* | 2/2003 | Sheha et al. | 701/209 |
| 2003/0164822 A1 | 9/2003 | Okada | |
| 2004/0158389 A1 | 8/2004 | Shibata et al. | |
| 2004/0236507 A1* | 11/2004 | Maruyama et al. | 701/208 |
| 2004/0243304 A1* | 12/2004 | Kato | 701/208 |
| 2004/0260464 A1* | 12/2004 | Wong | 701/209 |
| 2004/0267447 A1* | 12/2004 | Takizawa | 701/209 |
| 2005/0203698 A1* | 9/2005 | Lee | 701/200 |
| 2005/0278113 A1* | 12/2005 | Maruyama et al. | 701/208 |
| 2006/0229807 A1* | 10/2006 | Sheha et al. | 701/209 |
| 2007/0185650 A1* | 8/2007 | Yokota et al. | 701/211 |

FOREIGN PATENT DOCUMENTS

| | | |
|---|---|---|
| JP | A-2000-266550 | 9/2000 |
| JP | 2001-165680 A | 6/2001 |
| JP | A-2002-098541 | 4/2002 |
| JP | 2003-207346 A | 7/2003 |
| JP | A-2003-242151 | 8/2003 |
| JP | 2005-149481 A | 6/2005 |
| JP | A-2005-156290 | 6/2005 |
| KR | 10-2005-0000225 | 1/2005 |

OTHER PUBLICATIONS

Office Action dated Mar. 6, 2009 in corresponding Korean patent application No. 10-2006-0070471(and English translation).

Office Action dated Jul. 15, 2008 in corresponding Korean Patent Application No. 10-2006-0070471 (and English translation).

Office Action dated Feb. 20, 2009 in corresponding Chinese patent application No. 200610107483.0 (and English translation).

Office Action mailed Dec. 1, 2009 from the Japan Patent Office in the corresponding patent application No. 2005-217752 (English translation enclosed).

* cited by examiner

NAVIGATION SYSTEM INCLUDING DATABASE FOR STORING FEATURE INFORMATION FOR POINTS OF INTEREST

CROSS REFERENCE TO RELATED APPLICATIONS

This application is based on and incorporates herein by reference Japanese Patent Application No. 2005-217752 filed on Jul. 27, 2005.

FIELD OF THE INVENTION

The present invention relates to a navigation system, which preferentially provides feature information of a spot, e.g., a point of interest (POI).

BACKGROUND OF THE INVENTION

A user may not specifically memorize a destination to input to a navigation system. In this case, to designate an intended destination, the navigation system requires the user to serially perform several inputs for liming or narrowing down categories or areas relative to the intended destination.

To decrease these tiresome inputs, records of retrieval or designation for destinations are used for subsequent retrievals (Patent Document 1).

The above technologies provide information on a candidate destination or spot for a user to designate; however, the provided information such as a name or address is too limited information for the user to easily determine which spot is an intended destination.

Providing detail information on a spot may be useful for a user to determine it. However, several spots are typically shown at the beginning as a list with their limited information provided or displayed. If a user would like to reach detail information on a spot, the user needs to additionally repeat several inputs or operations.

Patent Document 1: JP-2005-156290 A

SUMMARY OF THE INVENTION

It is an object of the present invention to provide a navigation system to allow a user to easily determine whether a spot is an intended one.

According to an aspect of the present invention, a navigation system is provided as follows: a spot-site database is included for storing position information of each of spots including at least one of a locational point and a facility on a map; a spot-feature database is included for storing feature information with respect to each of the spots, the feature information allowing a user to perceive a feature of the each of the spots; accepting means is included for accepting from the user a retrieval condition to retrieve a spot; retrieving means is included for retrieving a spot meeting the accepted retrieval condition from the spot-site database; designating means is included for designating feature information corresponding to the retrieved spot; and information providing means is including for providing the designated feature information as initial information with respect to the retrieved spot.

In the above structure, with respect to a certain spot, its feature information, which allows a user to easily perceive a feature of the certain spot, can be provided as initial information provided to a user. Thus, the user can easily determine whether the certain spot is an intended one without need to repeat additional inputs or operations to reach the feature information of the certain spot.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

A navigation system 1 as an example according to an embodiment of the present invention will be explained below with reference to drawings.

(1) Structure

Figure 1:
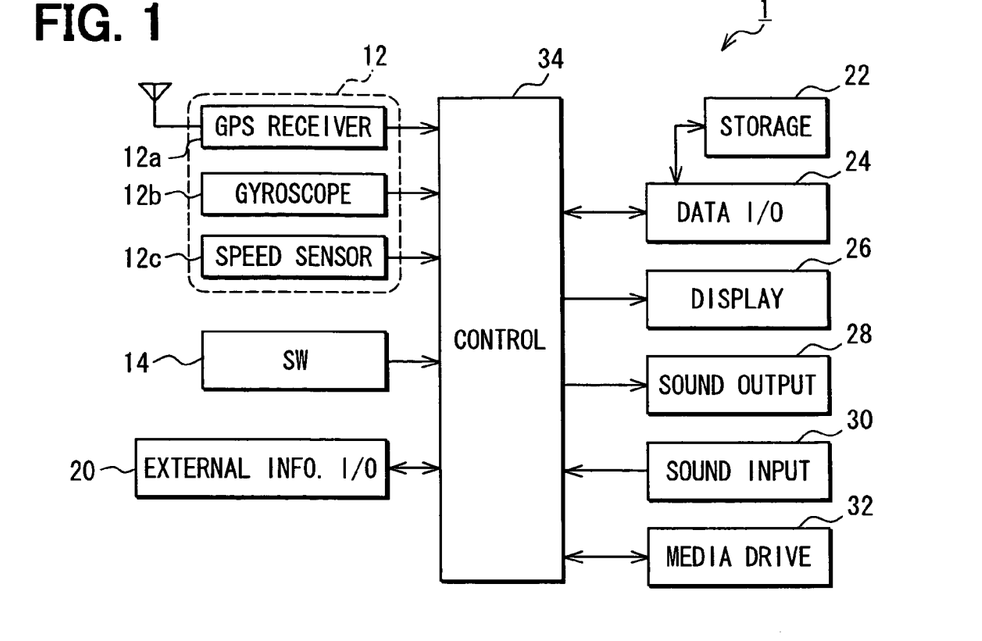
FIG. 1 is a diagram illustrating an overall structure of a navigation system as an example according to an embodiment of the present invention.

As shown in FIG. 1, a navigation system 1 mounted in a vehicle includes a position detector 12 to detect a current position of the navigation system itself or vehicle; an operation switch group 14 used for a user to input various instructions (or used for accepting inputs or instructions from a user); an external information input/output device 20 to input or output information from or to an outside; a data input/output device 24 to input or output data from or to a storage device 22 storing map data or the like; a display device 26 to display a map display window, a TV window, etc.; a sound output device 28 to output various guide sounds, etc.; a sound input device 30 to input sounds from a user; a media drive 32 to input or output data from or to a medium such as a CD, DVD, or memory card; and a control device 34 to control operations of the foregoing components or the like.

The position detector 12 includes a GPS (Global Positioning System) receiver 12a to detect a current position, orientation, or speed of the navigation system itself or vehicle by receiving radio waves via an antenna from GPS satellites; a gyroscope 12b to detect a rotational motion applied to the vehicle; and a speed sensor 12c to detect a back-and-forth vehicle speed based on vehicle speed pulses generated from a vehicle speed pulse generator. These sensors 12a to 12c have respectively various types of detection errors and are used in a mutually complementary manner to detect coordinates of the current position.

The operation switch group 14 is a touch panel formed on a display screen of the display device 26 and/or mechanical switches around the display device 26. The external information input/output device 20 wirelessly receives road traffic information indicating congestion, accident, construction, regulation, or the like, e.g., by receiving FM broadcast signals or radio beacon signals or optical beacon signal from a service station of a VICS (Vehicle Information and Communication System), which is located along a road.

The storage device 22 stores in a storage medium (e.g., hard disk) map data including information on roads and facilities along roads, and map matching data for increasing position detection accuracy.

The control device 34 includes a known microcomputer having a CPU, ROM, RAM, I/O, and bus line connecting the foregoing. Based on a program in the ROM, the control device 34 computes a current position, coordinates, and a vehicle's heading direction using detection signals from the position detector 12. The computed results are used for a map display process or a route guide process. In the map display process, the display device 26 is caused to display map (or map data) retrieved via the data input/output device 24. For instance, the displayed map data are regarding the periphery of a current position or an area designated via the operation switch group 14. In the route guide process, a destination is designated, an optimum route is automatically computed from the current position to the destination, and a route guide is then performed, as described below.

(2) Route Guide Process

Figure 2:
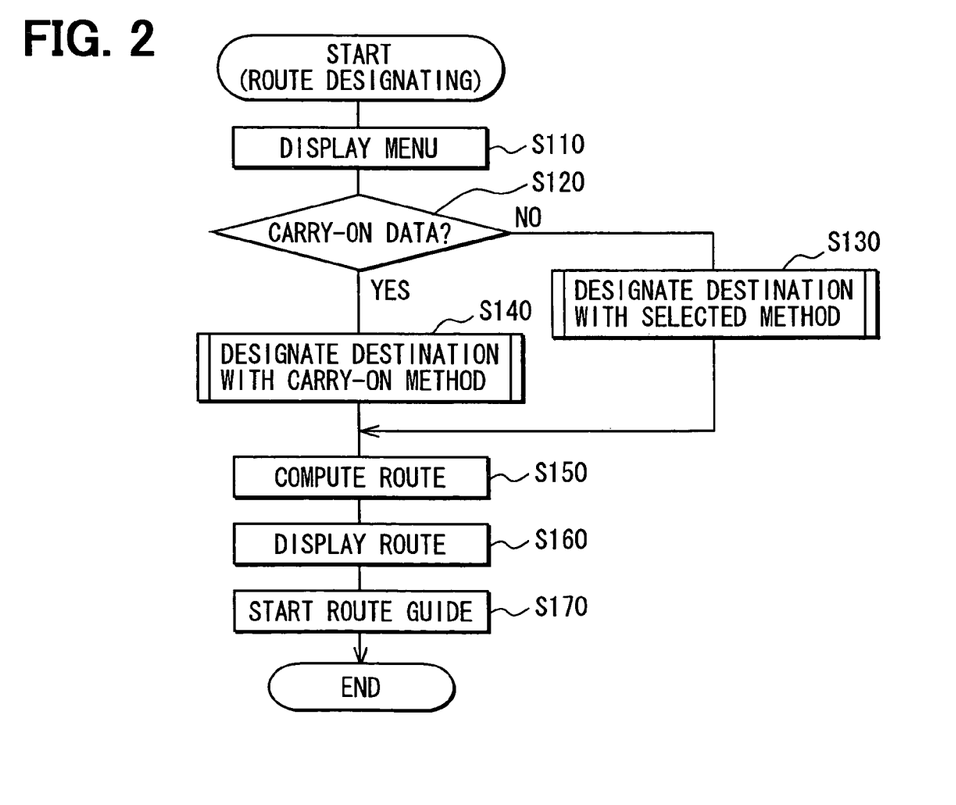
FIG. 2 is a flowchart diagram illustrating a process of determining a route.
Figure 3:
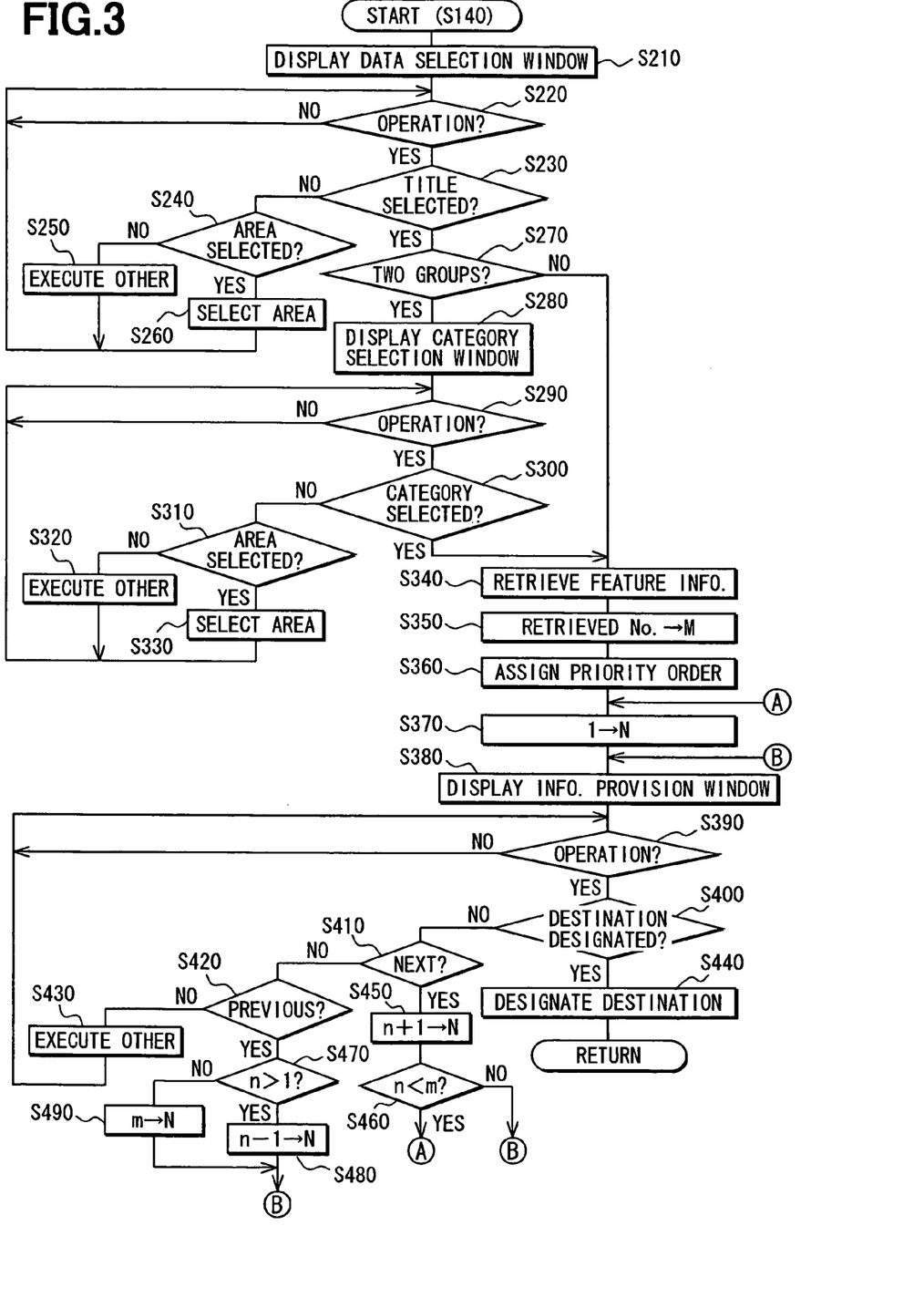
FIG. 3 is a flowchart diagram illustrating a process of designating a destination.

The control device 34 performs a route guide process, which will be explained with reference to flowcharts in FIGS. 2, 3. The process starts when an instruction for displaying a menu window is inputted via the operation switch group 14.

Figure 4:
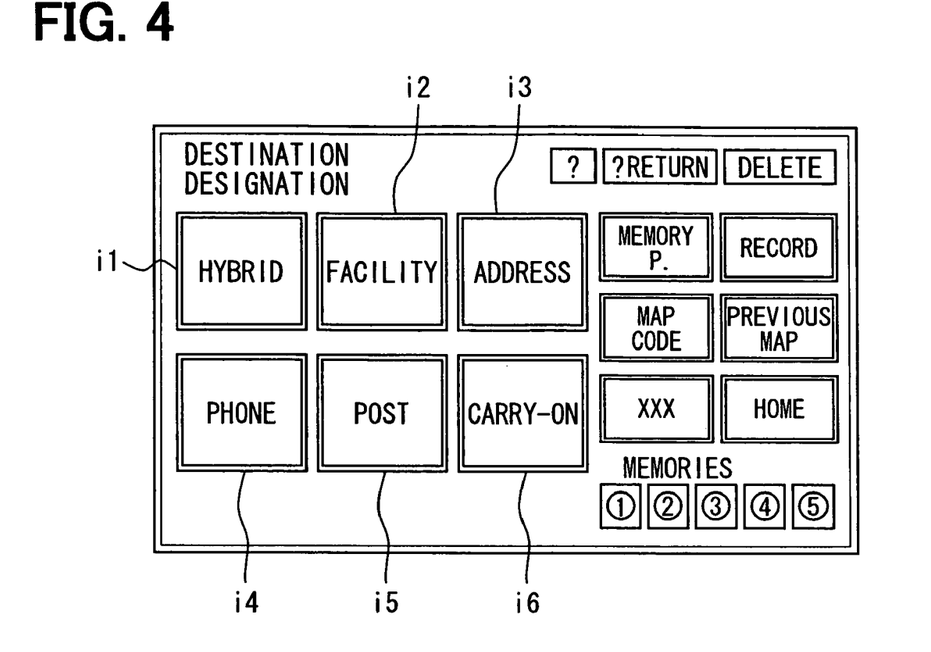
FIG. 4 is a menu window.

As the process starts, the display device 26 displays a menu window (S110) in its screen, as shown in FIG. 4. The menu includes several icons (or buttons) such as category (i2), address (i3), phone number (i4), post code (i5), hybrid (i1), and carry-on data (i6), all of which (i1 to i6) indicate methods for extracting an intended spot. The icon of hybrid (i1) means a combination of the foregoing methods (i2 to i5); the icon of carry-on data (i6) means a method to use data that is separately added as carry-on data. The user then selects one of the icons using the operation switch group 14.

"Carry-on data" is a database previously stored in a medium; the user installs the carry-on data in the storage device 22 via the media drive 32. The carry-on data include, with respect to each of spots (e.g., POIs (Points of Interest)), (i) feature information, (ii) a category, and (iii) position information or a position (coordinates), all of which are mutually associated. The feature information can be called "perception information" and means information helps or allows a user to perceive a feature of each spot. For instance, in the example, the feature information includes a data set of image data and expository text data; this data set represents a feature of the spot. The category includes a first layer group (including restaurant, tourist spot) and/or a second layer group which further divides the first group.

After the menu window is displayed at Step S110, one of the icons is selected and it is determined whether or not the carry-on data icon (i6) is selected (S120).

When any icon other than the carry-on data icon (i6) is selected (S120: NO), a destination is designated by following a typical method indicated by the selected icon (S130). Known destination designation is performed for a user to narrow down to designate a specific spot or the like as an intended destination using the operation switch group 14.

In contrast, when the carry-on data icon (i6) is selected (S120: YES), a destination is designated by following a carry-on data method using carry-on data (S140), which will be explained in detail later.

When a destination is designated at Step S130 or S140, a guide route is determined from a current position to the designated destination (S150). The guide route includes connection links up to the designated destination computed based on the map data in the storage device 22. The control device 34 stores the guide route in its inside memory.

The determined guide route is then displayed (S160), and a route guide or navigating starts along the guide route (S170).

Figure 5A:
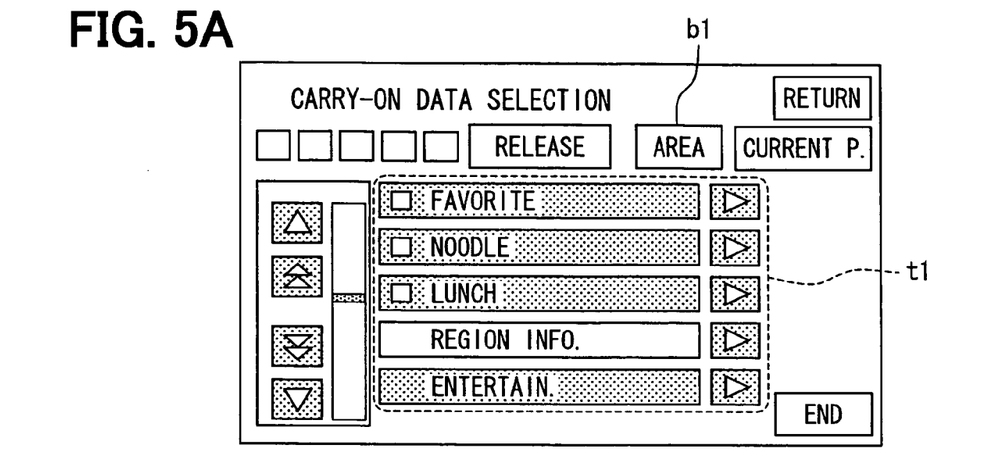
FIG. 5A is a data selection window.

Next, the carry-on data method at Step S140 will be explained. At first, a data selection window is displayed (S210), as shown in FIG. 5A. The menu includes database names t1 and an area selection button b1. The database names t1 are titles of carry-on data stored in the storage device 22. The area selection button b1 is used to select an area to be a start point for extracting a destination (the area is hereinafter called start-point area).

Without no operation (S220: NO) via the operation switch group 14, the window remain the same, i.e., in a waiting state. With operation (S220: YES), Step S230 and subsequent steps take place. When the operation is not performed to any database name t1 or the area selection button b1 (S230: NO, S240: NO), a process (S250) corresponding to the operation is completed; then, the sequence returns to Step S220. When the operation is to stop the route guide process, the sequence ends without returning to Step S220.

Figure 5B:
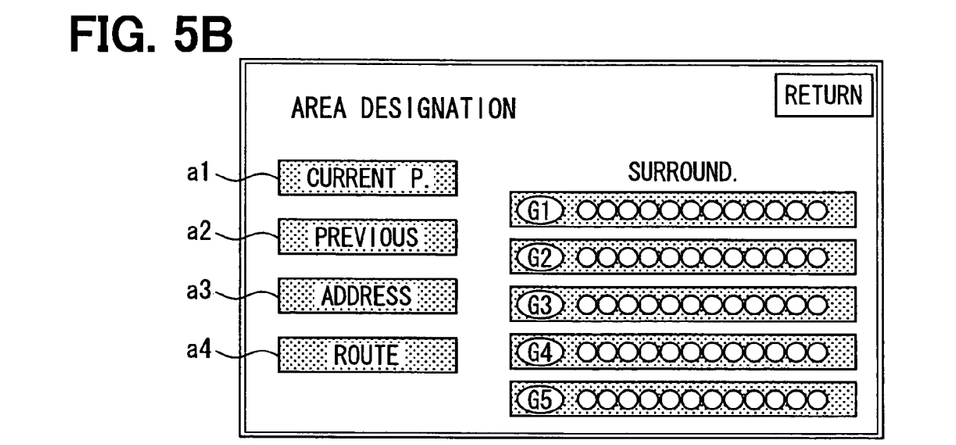
FIG. 5B is an area selection window.

When the area selection button b1 is operated (S230: NO, S240: YES), an area selection takes place (S260). After the area selection finishes, the sequence returns to Step S220. In the area selection, as shown in FIG. 5B, an area selection menu is displayed for the user to select a start-point area for extracting a destination. The area selection menu includes, for selecting a start-point area, the following four selection items or buttons: an area surrounding a current position (a1); an area of the map shown until just before (a2); an area surrounding a designated address (a3); and an area along the guide route (a4). User's selecting one of the four items causes a corresponding area to be defined as the start-point area (when the address button is selected, input of an address is additionally required). Then, the area selection button disappears. In the default, the start-point area is assigned to an area surrounding a current position.

Figure 5C:
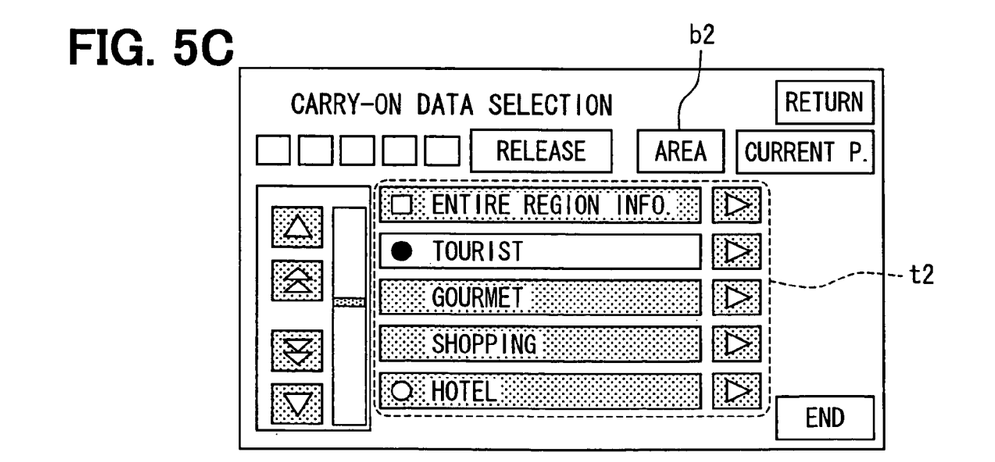
FIG. 5C is a category selection window.

When a certain title is selected (S230: YES), it is determined whether the database of the selected title is divided into the first and second groups (S270). When the database is divided into two groups (S270: YES), a category selection menu is displayed for the user to select a category (S280), as shown in FIG. 5C, which includes titles t2 of categories included in the lower level group and an area selection button b2.

Without no operation (S290: NO) via the operation switch group 14, the window remain the same, i.e., in a waiting state. With operation (S290: YES), Step S300 and subsequent steps take place. When the operation is not performed to any titles t2 of categories or the area selection button b2 (S300: NO, S310: NO), a process (S320) corresponding to the operation is completed; then, the sequence returns to Step S290. When the operation is to stop the route guide process, the sequence ends without returning to Step S290.

When the area selection button b2 is operated (S300: NO, S310: YES), an area selection takes place (S330). After the area selection finishes, the sequence returns to Step S290. At Step S330, a start-point area is designated like at Step S260.

Step S340 takes place when an operation is performed to select the category selection (S300: YES) or the database is not divided into two groups (S270: NO). At Step S340, feature information following the above selecting or designating procedure is retrieved from the database stored in the storage device 22 (S340).

At this step, spots stored or registered in this database corresponding to the title selected at Step S230 are reached. From the spots reached, spots situated in the currently designated start-point area are designated. For instance, when the currently designated start-point area is selected based on a current position, the current position is obtained from the position detector 12. When the start-point area is selected based on other than a current position, the coordinates of the center of the start-point area are obtained. The spots situated within a circle with a given radius (e.g., 5 km) centering at the obtained current position or the obtained coordinates are designated. If a certain category is previously selected at Step S300, the retrieval target is limited based on the selected category. Furthermore, the number (or count) of designated spots closer to the center of the start-point area can be limited to a certain number (e.g., 200 spots). Thus feature information items corresponding to the designated spots are retrieved.

Next, the number of spots designated at Step S340 is set to a variable M (S350). A value set to the variable M is defined as "m." A priority order is assigned to each designated spot in an ascending order of a distance from the center of the start-point area (S360). The closer to the center a spot is, the higher its priority order is.

Figure 6:
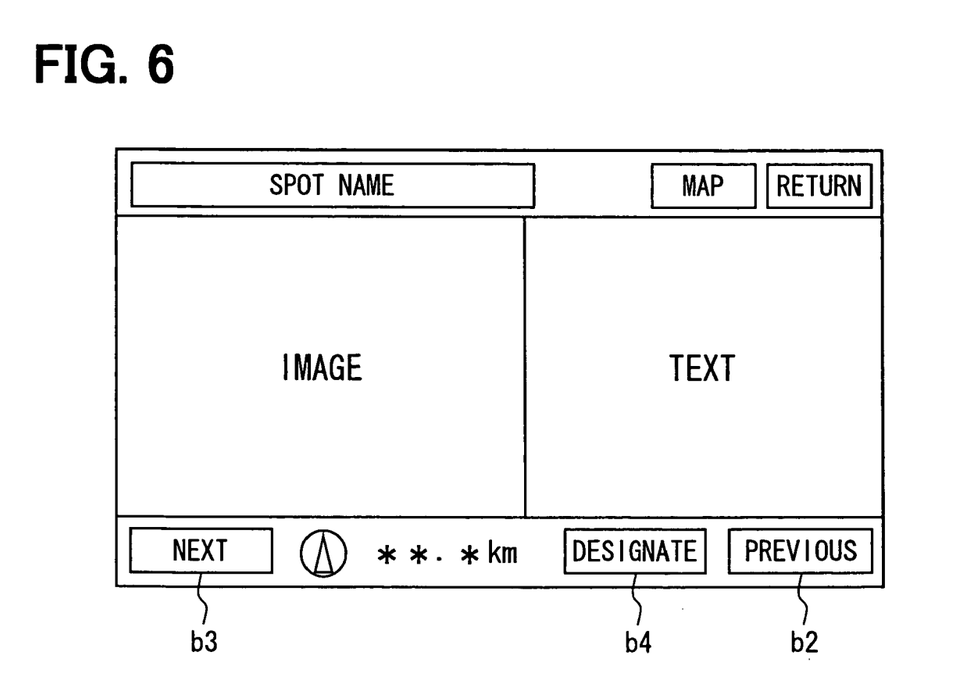
FIG. 6 is an information provision window.

A variable N is assigned "1" (1→N) (S370). A value assigned to the variable N is defined as "n." Next, feature information on the spot having the n-th priority order is selected from the database and the display device 26 displays an information provision window based on the selected feature information (S380). For instance, as shown in FIG. 6, the information provision window includes image data and test data, both of which are included in the feature information, and several buttons b2, b3, b4. The button b2 is used to display the spot having the higher priority order, while the button b3 is used to display the spot having the lower priority order. The button b4 is used to designate as a destination the spot corresponding to the currently displayed feature information.

Without no operation (S390: NO) via the operation switch group 14, the window remain the same, i.e., in a waiting state. With operation (S390: YES), Step S400 and subsequent steps take place. When the operation is not performed to any buttons b2 to b4 (S400: NO, S410: NO, S420: NO), a process (S430) corresponding to the operation is completed; then, the sequence returns to Step S390. For instance, a map surrounding the spot corresponding to the displayed feature information can be displayed based on the operation by the operation switch group 14. When the operation is to stop the route guide process, the sequence ends without returning to Step S390.

When the button b4 is selected (S400: YES), the spot (or the site of the spot) corresponding to the displayed n-th feature information is designated as a destination (S440). The sequence then returns to Step S150 in FIG. 2, where a route guide starts.

When the button b3 is selected (S400: NO, S410: YES), the variable N is incremented by "1" (n+1→N) (S450) and then it is determined whether the variable N is smaller than M (S460).

When the variable N is smaller than M (S460: NO), the sequence returns to Step S380 and information provision menu is displayed based on the n-th spot (i.e., spot having the next priority order).

When the variable N is not smaller than M (S460: YES), the sequence returns to Step S370. The variable N is assigned "1" (1→N) (S370), and an information provision menu is displayed based on the 1st spot (i.e., spot having the highest priority order). When the variable N is not smaller than M, which is the number of all the retrieved feature information items, the feature information corresponding to the lowest priority spot has been already displayed. Thus, selecting the button b3 causes the feature information having the first priority to be displayed again.

When the button b2 is selected (S400: NO, S410: NO, S420: YES), it is determined whether the variable N is greater than "1" (S470).

When the variable N is greater than "1" (S470: YES), the variable N is decremented by "1" (n−1→N) (S480). The sequence returns to Step S380 and an information provision menu is displayed based on the n-th spot (i.e., spot having the previous priority order).

When the variable N is not greater than "1" (S470: NO), the variable N is assigned "m" (m→N) (S490). The sequence returns to Step S380 and an information provision menu is displayed based on the n-th spot (i.e., spot having the lowest priority order). When the variable N is not greater than "1," the feature information corresponding to the highest priority spot is currently displayed. Thus, selecting the button b2 causes the feature information having the lowest priority to be displayed.

(3) Effects

When a start-point area is designated to an area surrounding a current position and a category is selected at Step S300, feature information on spots around the current position is provided to a user at the beginning at Step S380. This feature information includes image data and text data, both of which are suitable for a user to perceive a feature of the corresponding spot, i.e., POI. The text data including expository writings helps the user recognize the feature of the spot, while the image data helps the user to visually notice the feature as well. Therefore, the user easily determines whether the spot corresponding to the displayed feature information is an intended one or not. In this procedure, the feature information can be provided at the beginning of provision of the information on the spot. That is, the user only performs an operation (up to selection of the category) that triggers the provision of the feature information without need of any additional inputs or operations. This can enhance user-friendliness of the navigation system.

For example, the navigation system provides feature information on spots situated around a current position, so it helps prevent provision of information on spots situated very far from the current position. The information on the spots far from the current position may be useless for the user.

When the carry-on data have two-layered category groups, a retrieval target for the feature information can be further narrowed down to items included in the category further selected by the user (S300→S340). This enables provision of feature information to focus on a category intended by a user. The user would therefore easily reach an intended spot.

The feature information on the spot having higher priority order can be preferentially provided at the beginning (S370→S380). For instance, when a start-point area is designated to surround the current position, the spot closer to the current position can be more preferentially provided to the user. The user can therefore determine whether the provided spot is an intended one or not, from a spot closer to the current position.

After the information provision window is displayed (subsequent to S380), the user can serially switch feature information items corresponding to multiple spots, which are adjacent to each other, by using the button b3, b4 (subsequent to Step S380).

The spot corresponding to the displayed feature information can be designated as a destination for a route guide (S440); then, a route guide can be performed along the route to the designated spot.

(4) Other Embodiment

Figure 7:
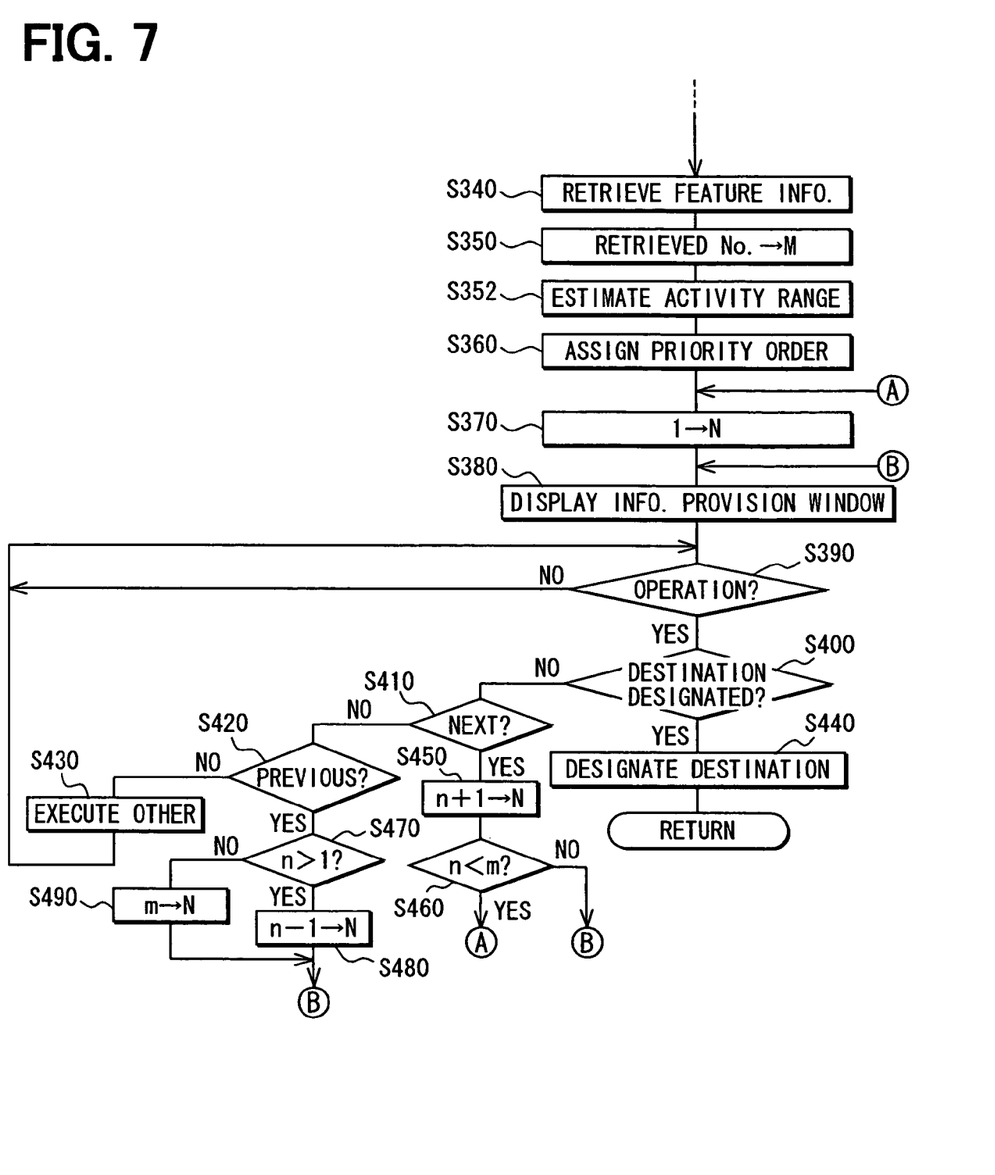
FIG. 7 is a flowchart diagram illustrating another process of designating a destination.

An example according to another embodiment will be explained with reference to FIG. 7. This has a difference from the above-described embodiment. At Step S360, a priority is assigned based on not only a distance from a center (e.g., current position) of a start-point area but also an activity range of a user.

For instance, after Step S350 is completed, an activity range of the user is estimated (S352) and Step S360 then takes place. In this example, current positions (or travel tracks) that have been detected (e.g., for one year) by the position detector 12 are stored in the storage device 22. At Step S352, an activity range is estimated or defined as areas (e.g., city, town) including the positions stored in the storage device 22. This activity range can be defined to include expanded regions included in a radius X m centered at the above previously detected respective current positions.

At Step S360, a higher priority is assigned to a spot that is included in the activity range of the user and closer to the center of the start-point area. Thus, the user can determine whether the spot, the feature information of which is displayed, is an intended one or not with the user's activity range prioritized. This can preferentially provide the user with a spot included in an area the user knows more in detail, resulting in preferential provision of the spot that is designated as an intended one with higher probability.

(5) Modifications

In the above explanation, the feature information includes image data and text data; however, it can also include another data such as audio data or speech data which can appropriately help or allow a user to perceive the feature of the spot by outputting the audio data via the sound output device 28.

In the above explanation, the carry-on data is installed in the storage device 22. However, it can be installed in a device, which can communicate with the navigation system 1, and moved to the navigation system 1. Furthermore, it can be obtained via the media drive 32 from a medium storing carry-on data.

In the above explanation, the carry-on data as a single data set is grouped into more than one. However, a single carry-on dataset can be configured to include only one category-specific group. Multiple category-specific data sets can be physically provided.

In the above explanation, the feature information having higher priority is displayed preferentially (S370→S380). However, alternatively, multiple feature information items with respect to multiple spots can be simultaneously displayed on the same screen with the higher prioritized spot more distinctive (larger, more remarkably colored, etc.). Thus, a user can see multiple spot-specific feature information items at the same time on a priority basis and therefore easily select an intended one.

In the above explanation, the carry-on data is carried from outside and installed as a database in the storage device 22. However, a database can be alternatively configured as follows: for instance, when the information provision window appears at Step S380, a user can register this window with an independent database, and this "FAVORITE" is displayed as one of selectable titles at Step S210 (see FIG. 5A).

The feature information can be called perception information and variously configured to include one of, or any combination of (i) image data, (ii) text data, and (iii) audio data (or speech data).

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A navigation system comprising:
   a computer readable medium including stored therein:
      a spot-site database configured to store position information of each of spots including at least one of a locational point and a facility on a map; and
      a spot-feature database configured to store feature information with respect to each of the spots, the feature information allowing a user to perceive a feature of the each of the spots;
   position obtaining means for obtaining a current position;
   activity range estimating means for estimating an activity range of the user based on records of former current positions obtained previously by the position obtaining means;
   accepting means configured to accept a retrieval condition from the user to retrieve spots;
   retrieving means configured to retrieve spots that meet the accepted retrieval condition from the spot-site database and are within a given region approximately centered at a current position obtained by the position obtaining means;
   designating means configured to designate feature information corresponding to each of the retrieved spots from the spot-feature database; and
   information providing means configured to provide, with respect to each of the retrieved spots, the designated feature information as initial information displayed prior to display of any other retrieved information including position information associated with the retrieved spot, wherein the information providing means provides designated feature information of a spot included in the activity range with a higher priority than a spot that is outside the activity range.

2. The navigation system of claim 1, wherein
   the spot-site database further stores a category with respect to each of the spots,
   the accepting means accepts a category as the retrieval condition; and
   the retrieving means retrieves a spot meeting the accepted category from the spot-site database.

3. The navigation system of claim 1, further comprising:
   destination designating means for designating as a destination a spot corresponding to the feature information provided by the information providing means;
   route computing means for computing a route from the obtained current position to the designated destination; and
   route guiding means for guiding the user along the computed route.

4. The navigation system of claim 1, wherein
   the feature information includes image data, which allows the user to visually perceive the feature of the retrieved spot, and
   the information providing means provides the feature information by displaying the image data of the feature information on a display device.

5. The navigation system of claim 4, wherein
the feature information further includes text data, and
the information providing means provides the feature information by displaying both the image data and the text data of the feature information on the display device.

6. The navigation system of claim 4, wherein
the feature information further includes speech data, which allows the user to acoustically perceive the feature, and
the information providing means provides the feature information by displaying the image data on the display device and outputting the speech data via a sound output device.

7. A method for providing a user of information by using a computer readable medium including:
a spot-site database that stores position information of each of spots including points of interest on a map;
a spot-feature database that stores feature information with respect to each of the spots, the feature information includes a data set of image data and text data to permit a user to perceive a feature of each of the spots; and
the method comprising:
accepting from a user a category as a retrieval condition, instead of a name of a spot, to retrieve the spot;
detecting a present position;
retrieving spots meeting the accepted category and arranging the retrieved spots in a priority order based on the detected current position from the spot-site database;
displaying a first display window including feature information that is related to the retrieved spot having a highest priority, wherein the first display window contains only image data and text data from the data set, as initial information displayed prior to displaying any other retrieved information including position information associated with a one of the retrieved spots having the highest priority; and
if a predetermined operation to move from the first display window is performed by the user while the feature information corresponding to the retrieved spot having the highest priority is being displayed in the first display window, displaying a second display window including feature information that is related to a one of the retrieved spots having a second-highest priority, wherein the second display window contains only image data and text data from the data set.

8. A navigation system comprising:
a computer readable medium including stored therein:
a spot-site database that stores position information of each of spots including points of interest on a map; and
a spot-feature database that stores feature information with respect to each of the spots, the feature information includes a data set of image data and text data to permit a user to perceive a feature of each of the spots;
a position obtaining unit to obtain a current position;
an input unit used to input a category as a retrieval condition to retrieve a spot;
an information providing unit that outputs information to the user; and
a control unit that
retrieves spots meeting the accepted category and arranges the retrieved spots in a priority order based on the detected current position from the spot-site database,
causes the information providing unit to display a first display window including feature information that is related to one of the retrieved spots having a highest priority and contains only image data and text data from the dataset, as initial information displayed prior to displaying any other retrieved information including position information associated with the retrieved spot having the highest priority, and
if a predetermined operation to move from the first display window is made by the user while the feature information corresponding to the retrieved spot having the highest priority is being displayed in the first display window, causes the information providing unit to display a second display window including feature information that is related to a one of the retrieved spots having a second-highest priority and contains only image data and text data from the data set.

9. A navigation system comprising:
a display device;
a storage device configured to store position information and feature information for each of a plurality of spots, the feature information includes a data set of image data and text data to permit a user to perceive a feature of the each of the spots;
an operation switch group configured to accept from a user a category that enables selection of a sub-set of the plurality of spots; and
a control device coupled to the display device, the storage device and the operation switch group, the control device configured to execute a program stored in an associated memory, the control device configured to:
designate the sub-set of the plurality of spots based upon the category inputted from the user via the operation switch group;
assign a priority for each of the spots in the sub-set of the plurality of spots based upon a distance from a predetermined starting point; and
cause the display device to display the feature information containing only the data set of image data and text data for each of the spots in the sub-set of the plurality of spots in an initial screen display in accordance with its assigned priority, wherein the initial screen display not including any other retrieved information including position information associated with the retrieved spot,
wherein the initial screen display is in an information provision window including the feature information of only one of the spots having a first priority and one or more buttons for facilitating input or instructions via the operation switch group to select feature information containing only the data set of image data and text data corresponding to a subsequent spot in the sub-set of the plurality of spots having a second priority.

10. The navigation system of claim 8, wherein the control device is further configured to cause the information providing unit to display the first display window and to further include one or more buttons for facilitating input or instructions from the user to select feature information corresponding to a different spot, one of the buttons being used for moving from the first display window.

11. The method of claim 7, wherein the displaying the first display window further includes providing one or more buttons for facilitating input or instructions from the user to select feature information corresponding to a different spot, one of the buttons being used for moving from the first display window.

* * * * *